United States Patent
Li

(10) Patent No.: US 9,836,612 B2
(45) Date of Patent: Dec. 5, 2017

(54) PROTECTING DATA

(71) Applicant: Alibaba Group Holding Limited, George Town (KY)

(72) Inventor: Jian Li, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 14/280,145

(22) Filed: May 16, 2014

(65) Prior Publication Data
US 2014/0344569 A1 Nov. 20, 2014

(30) Foreign Application Priority Data

May 20, 2013 (CN) .......................... 2013 1 0186287

(51) Int. Cl.
G06F 21/60 (2013.01)
G06F 21/12 (2013.01)
G06F 21/14 (2013.01)
H04L 29/06 (2006.01)

(52) U.S. Cl.
CPC ............ G06F 21/60 (2013.01); G06F 21/128 (2013.01); G06F 21/14 (2013.01); H04L 63/062 (2013.01); H04L 63/0807 (2013.01)

(58) Field of Classification Search
CPC ........ G06F 21/60; G06F 21/128; G06F 21/14; H04L 63/0807; H04L 63/062
See application file for complete search history.

(56) References Cited

U.S. PATENT DOCUMENTS

| 6,668,325 | B1 * | 12/2003 | Collberg ................. G06F 21/14 713/194 |
| 6,829,614 | B2 | 12/2004 | Fujishima et al. |
| 7,065,652 | B1 | 6/2006 | Xu et al. |
| 8,806,223 | B2 | 8/2014 | Crowe |

(Continued)

FOREIGN PATENT DOCUMENTS

| CN | 101807239 A | 8/2010 |
| CN | 101986326 A | 3/2011 |

(Continued)

OTHER PUBLICATIONS

Github. "UglifyJS", Jun. 2011, pp. 1-8 http://web.archive.org/web/20130807040731/https://github.com/mishooUglifyJS/.*

(Continued)

Primary Examiner — Theodore C. Parsons
Assistant Examiner — Carlos M De Jesus Lassala
(74) Attorney, Agent, or Firm — Van Pelt, Yi & James LLP

(57) ABSTRACT

Protecting data is disclosed, including: analyzing, using one or more processors, a set of scripting resource source data to determine a plurality of semantic units; determining a tree-structured source data based at least in part on mapping values of the plurality of semantic units to respective ones of a plurality of semantic structures; selecting an obfuscation strategy to apply to the tree-structured source data, wherein the selected obfuscation strategy includes one or more obfuscation techniques; determining an obfuscated tree-structured source data based at least in part by applying the selected obfuscation strategy to the tree-structured source data; and converting the obfuscated tree-structured source data into a set of obfuscated scripting resource source data.

18 Claims, 7 Drawing Sheets

(56) References Cited

U.S. PATENT DOCUMENTS

| | | | |
|---|---|---|---|
| 8,910,297 B2 | 12/2014 | Strassmann et al. | |
| 8,914,859 B2 | 12/2014 | Erickson et al. | |
| 2004/0260933 A1* | 12/2004 | Lee | G06F 21/14 713/193 |
| 2006/0195703 A1* | 8/2006 | Jakubowski | G06F 8/51 713/190 |
| 2007/0005991 A1* | 1/2007 | Kober | G06F 21/572 713/193 |
| 2007/0039048 A1* | 2/2007 | Shelest | G06F 21/566 726/22 |
| 2007/0299928 A1* | 12/2007 | Kohli | H04L 63/10 709/217 |
| 2008/0123861 A1* | 5/2008 | Chow | H04L 63/06 380/279 |
| 2009/0316897 A1* | 12/2009 | Kambayashi | H04L 9/0897 380/255 |
| 2010/0122180 A1* | 5/2010 | Kamiyama | G06F 17/30867 715/744 |
| 2012/0272329 A1 | 10/2012 | Grammer et al. | |
| 2013/0110945 A1* | 5/2013 | Tamiya | H04N 7/181 709/206 |
| 2013/0254519 A1* | 9/2013 | Benoit | H04W 12/04 713/1 |

FOREIGN PATENT DOCUMENTS

| | | |
|---|---|---|
| JP | 2004140703 | 5/2004 |
| JP | 2013061843 A | 4/2013 |
| JP | 2014186905 | 10/2014 |
| WO | 2012177872 | 12/2012 |
| WO | 2013091709 | 6/2013 |

OTHER PUBLICATIONS

Mihai Bazon. "UglifyJS—a JavaScript parser/compressor/beautifier". Oct. 20, 2012. https://github.com/mishoo/UglifyJS.

Anonymous. "Releases . mishoo/UglifyJS . GitHub". Aug. 7, 2014. https://github.com/mishoo/UglifyJS/releases.

Author Unknown, [symposium] JS script confused encryption, Classic Forum, Welcome to participate in the discussion!, downloaded from http://bbs.blueidea.com/forum.php?mod=viewthread&tid=2440360, Translated via Google Translate, Jan. 30, 2006.

Omichi Takehiro et al., Proposal of Simple Content Distribution System and Consideration of its Safety, the 72nd (year 2010) All Japan Lecture Papers (3), Japan, Information Processing Society, Mar. 8, 2010, 2ZE-4, p. 3-633 to 3-634.

Yamauchi Hiroki et al., Protection of Encrypted Program by Obfuscation Considering Attack Task, Institute of Electronics, Information and Communication Engineers Research Report, Japan, Institute of Electronic, Information and Communication Engineers, Dec. 12, 2005, vol. 105 No. 490, p. 25-30.

Baoguo Zhang, "Regarding JAVA Code Obfuscation Research", from "Chinese Excellent Masters Dissertation Full Text Database" 4th period. Published Apr. 15, 2009.

* cited by examiner

PROTECTING DATA

CROSS REFERENCE TO OTHER APPLICATIONS

This application claims priority to People's Republic of China Patent Application No. 201310186287.7 entitled A DATA PROTECTION METHOD AND DEVICE, filed May 20, 2013 which is incorporated herein by reference for all purposes.

FIELD OF THE INVENTION

This application involves the field of data security. In particular, it involves techniques for data protection.

BACKGROUND OF THE INVENTION

As the use of computers and other terminal equipment today broadens in scope, the security of source data stored at client devices or transmitted among client devices becomes an increasingly important issue. The failure to implement source data protection or the adoption of inadequate protection measures has resulted in forgery, falsification, replacement, loss, and/or leakage of source data in the process of users using email, web browsers, and other software applications to transmit, exchange, and/or store this source data. Source data includes computer code, for example.

For example, JavaScript, a scripting language widely used by client devices in web development, is often used to add dynamic functions to a web page. The use of JavaScript has enabled real-time, dynamic, interactive relationships between web pages and users. However, because JavaScript source code (e.g., source data) is commonly presented to client devices in cleartext format, important data collected using JavaScript may be at risk of forgery, falsification, and replacement by malicious users and/or programs running at the client devices. Sensitive source data or valuable information that is present in the cleartext can be obtained easily within the client device and such information can be used to perform illegal operations at the client device.

In conventional systems, to increase the security of using source data at a client device, source data is obfuscated on the server side and sensitive data collected on the client side for transmission to the server becomes encrypted. However, the majority of conventional systems employ fixed encryption techniques, fixed encryption keys, and fixed obfuscation parameters. However, once such static techniques of obfuscating and encrypting are deciphered by malicious users or programs, data is very easily forged and falsified, which presents a direct threat to the security of the source data.

BRIEF DESCRIPTION OF THE DRAWINGS

Various embodiments of the invention are disclosed in the following detailed description and the accompanying drawings.

DETAILED DESCRIPTION

Figure 1:
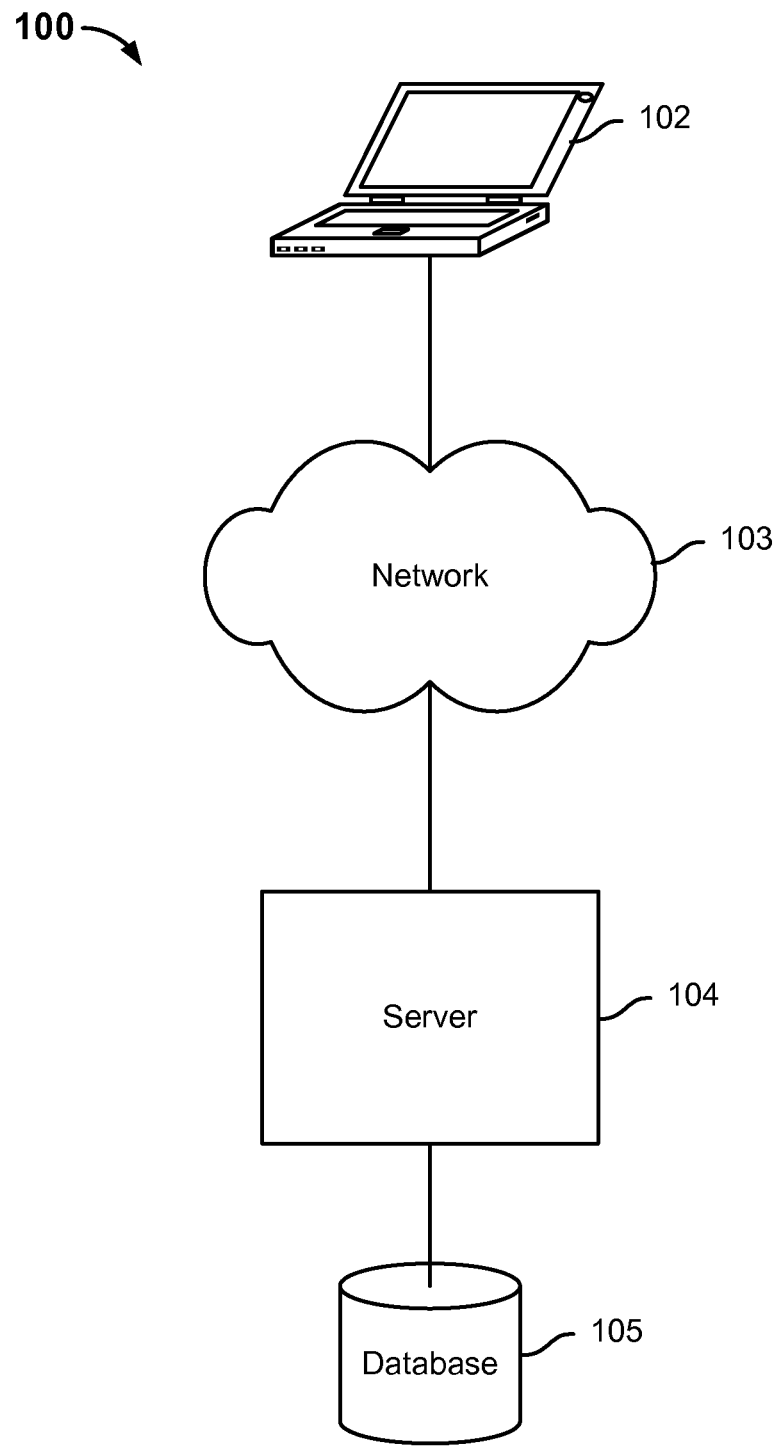
FIG. 1 is a diagram showing an embodiment for protecting data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of protecting data are described herein. In various embodiments, protecting data includes performing obfuscation on a set of scripting resource source data that is requested by a client device. The set of scripting resource source data is analyzed to determine a plurality of semantic units. For example, the set of scripting resource source data comprises JavaScript code. A tree-structured source data is determined based at least in part on mapping the values of the plurality of semantic units to respective ones of the plurality of semantic structures. An obfuscation strategy to apply to the tree-structured source data is selected. The obfuscation strategy can include a particular sequence of one or more types of obfuscation techniques. An obfuscated tree-structured source data is determined based at least in part by applying the selected obfuscation strategy to the tree-structured source data. The obfuscated tree-structured source data is converted into a set of obfuscated scripting resource source data. The set of obfuscated scripting resource source data can be sent to the client device.

In some embodiments, encryption tools (e.g., a selected encryption technique and an encryption key) to be sent to a client device are protected by being included in a set of scripting resource source data that is obfuscated prior to being sent to the client device. In some embodiments, the set of obfuscated scripting resource source data, when executed at the client device, is configured to collect certain client-related parameters, encrypt the collected client-related parameters using the encryption tools included in the set of obfuscated scripting resource source data, and send the encrypted client-related parameters to the server. In some embodiments, the server can perform data verification on the received encrypted client-related parameters to determine whether any malicious activity might have occurred at the client device.

FIG. 1 is a diagram showing an embodiment for protecting data. In the example, system 100 includes client device 102, network 103, server 104, and database 105. Network 103 includes high-speed data networks and/or telecommunication networks. Client device 102 is configured to communicate with server 104 over network 103.

While client device 102 is shown to be a laptop in the diagram, other examples of client device 102 may be a desktop computer, a tablet device, a smart phone, a mobile device, or any computing device. Client device 102 is configured to request for a set of scripting resource source data from server 104. In various embodiments, server 104 is configured to retrieve the request for the set of scripting resource source data from database 105 and perform obfuscation on the requested set of scripting resource source data prior to sending it to client device 102. Obfuscation is performed to reduce the readability of the source data and to increase the difficulty in deciphering the source data. Obfuscation can increase the protection and security of the source data by decreasing the likelihood that a malicious party can read the potentially sensitive information included in the scripting resource source data, such as data structures, data processes, function entry points, and/or parameters.

To obfuscate the requested set of scripting resource source data, server 104 is configured to analyze a set of scripting resource source data to determine a plurality of semantic units. In some embodiments, a "semantic unit" refers to a portion of the scripting data that can be associated with a semantic content. For example, semantic units can be recognized based on the syntax and/or grammar associated with the language in which the set of scripting resource source data is written. Server 104 is configured to determine a tree-structured source data based at least in part on mapping values of the plurality of semantic units to respective ones of a plurality of semantic structures. The tree-structure of the source data preserves the logical and/or semantic relationships between different semantic structures and the components thereof. Server 104 is configured to select an obfuscation strategy to apply to the tree-structured source data, wherein the selected obfuscation strategy includes one or more obfuscation techniques. Server 104 is configured to generate an obfuscated tree-structured source data based at least in part by applying the selected obfuscation strategy to the tree-structured source data. Server 104 is configured to convert the obfuscated tree-structured source data into a set of obfuscated scripting resource source data. Server 104 then sends the set of obfuscated scripting resource source data to client device 102.

In some embodiments, the set of obfuscated scripting resource source data is configured to include an encryption technique and an encryption key. In some embodiments, the set of obfuscated scripting resource source data, when executed at client device 102, is configured to collect certain client-related parameters, encrypt the collected client-related parameters using the encryption tools included in the set of obfuscated scripting resource source data, and send the encrypted client-related parameters to server 104. Encryption can improve the security of the collected client-related parameters, which may include sensitive data, by decreasing the likelihood that it will be understood by malicious parties. Server 104 is configured to perform data verification on the received encrypted client-related parameters to determine whether any malicious activity might have occurred at client device 102.

Therefore, obfuscation and/or encryption on a set of scripting resource source data and/or client-related parameters sent between client device 102 and server 104 can prevent certain parties from accessing data for which they do not have authority to access.

Figure 2:
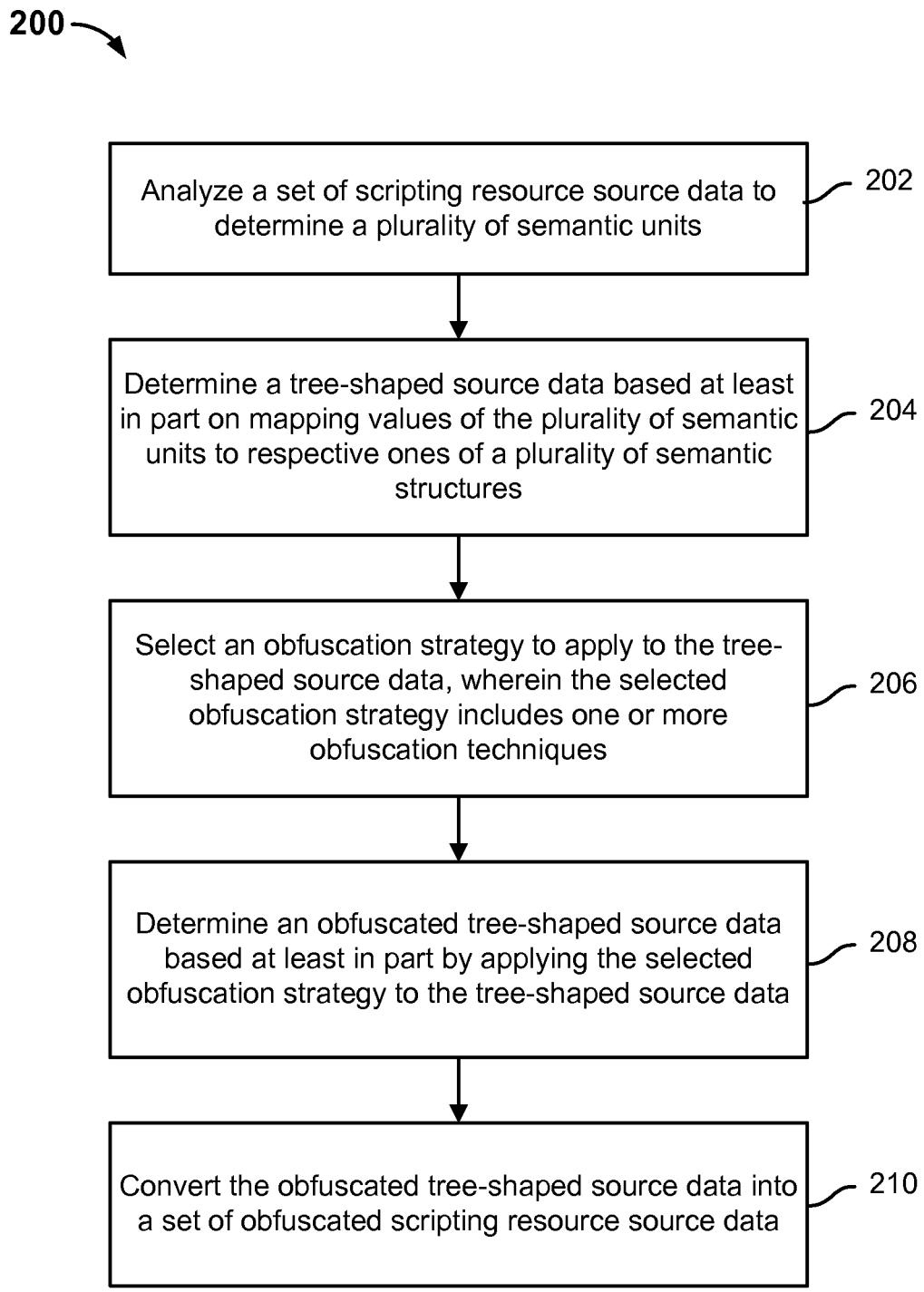
FIG. 2 is a flow diagram showing an embodiment of a process for protecting data.

FIG. 2 is a flow diagram showing an embodiment of a process for protecting data. In some embodiments, process 200 is implemented at system 100 of FIG. 1. Specifically, in some embodiments, process 200 is implemented at server 104 of system 100 of FIG. 1.

Process 200 describes an example of obfuscating cleartext scripting resource source data (e.g., a piece of JavaScript code) such that the resulting obfuscating scripting resource source data can be executed to obtain the identical execution results that would have been obtained through executing the original, cleartext resource source data prior to obfuscation. In various embodiments, "cleartext" refers to data that has not been obfuscated and/or encrypted. Process 200 describes an example of performing "equivalent obfuscation," which refers to a type of obfuscation that results in obfuscated data that can be executed to yield the identical results as the original, cleartext obfuscated data.

For example, a request for a set of scripting resource source data from a client device is received at a server. In response to the request, the server can perform process 200 to obfuscate the requested set of scripting resource source data and then transmit the set of obfuscated scripting resource source data back to the client device.

At 202, a set of scripting resource source data is analyzed to determine a plurality of semantic units.

In some embodiments, syntactical and/or semantic analysis is performed on a set of scripting resource source data (e.g., that has been requested by a client device). For example, the set of scripting resource source data is JavaScript code. The JavaScript code can be configured to perform one or more functions at the client device. For example, during the analysis, the set of scripting resource source data is extracted into a long character string. Scanning and syntactical analysis are performed with respect to this long character string and the meaningful semantic units included in this long character string are identified and extracted as semantic units included in the scripting resource source data. In some embodiments, analysis is performed based at least in part on semantic rules (e.g., associated with the type of language in which the set of scripting resource source data is written). Semantic rules include characteristics (e.g., the syntax or grammar) of various types of semantic units and/or criteria associated with each type of semantic. For example, a semantic rule can indicate that the keyword "for" indicates the presence of a loop and that such a loop is associated with the structure of "for (; ;) { }". In applying this example semantic rule, portions (e.g., sections of code) of the set of scripting resource source data that include "for (; ;) { }" are searched for in the long character string. Each semantic unit that is extracted from the long character string includes the values and/or character strings associated with the parameters of that semantic unit in the original set of resource source data. Examples of semantic units can include, but are not limited to: function declarations, statement(s), function calls, script root nodes, variable declarations, variable value assignments, and loops.

In some embodiments, the set of scripting resource source data can include a selected encryption key and a selected encryption technique, as will be described in further detail below.

In some embodiments, the semantic analysis is performed by a compiler program in compiling the set of scripting resource source data.

At 204, a tree-structured source data is determined based at least in part on mapping values of the plurality of semantic units to respective ones of a plurality of semantic structures.

In various embodiments, multiple semantic structures are stored in a predetermined tree-structured semantic structure definitions library. For example, a semantic structure stored in the predetermined tree-structured semantic structure definition includes general/generic parameter values and/or character strings for that semantic structure. Also for example, a semantic structure stored in the predetermined tree-structured semantic structure definition can also include the hierarchical and/or tree relationships among its parameters and/or between itself and other semantic structures stored in the library.

Examples of semantic structure definitions stored in the library include one or more of the following:

a) Script Root Node

Under the script root node, any nodes conforming to the features of JavaScript can be added to the tree-structured source data.

An example of a script root node is below:

```
Struct script{
    Node1 node1 ;
    Node2 node2 ;
    ................
}
``` b) Block Structures

In some embodiments, a block structure is a group together of zero or more statements.

An example of a block structure is below:

```
Struct BLOCK( ){
    Node1 node1 ;
    Node2 node2 ;
    ................
}
``` c) Function Declarations

An example of a function declaration is below:

```
Struct Function( ){
    FunctionParam param1;
    FunctionParam param2;
    ...................
    //argument declarations
    BLOCK doBlock; //define main executive structure
    FunctionReturnNode return;
}
``` d) Function Calls

A function call illustrates a call to a declared function. A function call includes the function name and the parameters of the function.

An example of a function call is below:

```
Struct FunctionCall ( ) {
    StringNode functionName;
    numNode param1;
    numNode param2;
    ................
    //Parameter input function
}
``` e) Underlying Data Node Declarations

Examples of declarations of basic data nodes are below: NumNode declares a numeric type of node that represents a specific number.

StringNode declares a string type of node, the string representative of a specific string.

f) Variable Declaration

Examples of declarations of variable declarations are below:

```
Struct var ( ) {
    VarName name;
    (NumNode num1 ;)
    (StringNode string1 ;)
    ................
}
``` g) Variable Value Assignments

Values for variables that have been declared can be assigned. An example of variable value assignments is below:

```
Struct SetValue ( ) {
    VarName name;
    (NumNode num1 ;) or (StringNode string1 ;)
}
```

Other examples of semantic structures that are not shown but may be included in the predetermined tree-structured semantic structure definitions library include one or more of the following: variable references, variable operators, and loop syntax structures.

For each semantic unit determined from analyzing the set of scripting resource source data, a corresponding semantic structure is determined from the predetermined tree-structured semantic structure definitions library. Then, each semantic unit determined from analyzing the set of scripting resource source data is mounted onto its corresponding semantic structure. In various embodiments, "mounting" a semantic unit onto the corresponding semantic structure refers to mapping the character string values and/or numerical values of the semantic unit to appropriate locations in the corresponding semantic structure. For example, mounting a semantic unit (extracted from the original set of scripting resource source data) that comprises a function includes mapping the actual values of the semantic unit to replace the corresponding general/generic parameter names and/or to add to the appropriate locations in the corresponding semantic structure (obtained from the predetermined tree-structured semantic structure definitions library).

An example of mapping the values from (e.g., mounting) a semantic unit to a corresponding semantic structure is as follows: if it was determined through analysis (at step 202) that the long character string included the statement "function add (num1, num2)" and based on semantic unit extraction rules, it is determined that the code in this location includes a function declaration, the statement "function add (num1, num2)" can be extracted as a semantic unit. The semantic structure of "struct function ( )" corresponding to the function declaration semantic unit is found in the predetermined tree-structured semantic structure definitions library. The function declaration semantic unit "function add (num1, num2)" is mounted onto the corresponding semantic structure of "struct function ( )" by mapping the values of function name "add" and parameter values "num1" and "num2" to the appropriate locations of the semantic structure to obtain the mounted semantic structure of "struct function add (num1, num2)."

The semantic structures mounted with corresponding semantic units are assembled to form a tree-structured source data. In some embodiments, the tree comprises an abstract syntax tree, which represents the abstract syntactic structure of the set of scripting resource source data. For example, each node of the tree semantic structure is filled in with a value mapped from (e.g., mounted with) a corresponding semantic unit determined from analyzing the set of scripting resource source data. For example, the tree-structured source data can be formed with the semantic structures found in the predetermined tree-structured semantic structure definitions library mounted with their respective semantic units based on tree-related and/or other logical relationships among semantic structures and/or components within each semantic structure that are specified in the predetermined tree-structured semantic structure definitions library. In some embodiments, the tree-structured source data is determined by a compiler program compiling the set of scripting resource source data. In some embodiments, the compiler program can determine the tree-structured source data based at least in part on tree-related relationships among semantic structures and/or components within each semantic structure that are specified in the predetermined tree-structured semantic structure definitions library.

At 206, an obfuscation strategy to apply to the tree-structured source data is selected, wherein the selected obfuscation strategy includes one or more obfuscation techniques.

The obfuscation strategy includes the application of a specified sequence of one or more types of obfuscation techniques. In various embodiments, the selection of the obfuscation strategy includes the selection of one or more specific obfuscation techniques and/or the determination of the order in which to apply the selected specific obfuscation techniques to the tree-structured source data. Any obfuscation strategy that is selected and applied to the tree-structured source data should result in equivalent obfuscation performed by the server, i.e., the resulting obfuscated set of scripting resource source data can be executed to yield the same results as would be determined from executing the cleartext, pre-obfuscation set of scripting resource source data.

In some embodiments, a predetermined obfuscation strategy can be selected in advance to serve as the obfuscation strategy for the tree-structured source data. In some embodiments, one or more obfuscation techniques can be dynamically and randomly selected from among multiple predetermined obfuscation techniques to serve as the obfuscation strategy for a tree-structured source data.

In some embodiments, the one or more obfuscation techniques to include in the obfuscation strategy can be selected to meet a desirable level of obfuscation. For example, the more difficult it is to decipher the obfuscated data, the higher the degree of obfuscation, and the easier it is to decipher the obfuscated data, the lower the degree of obfuscation.

In some embodiments, a selected obfuscation strategy can include one or more obfuscation techniques selected from one or more of the following: variable name substitution, function name substitution, numerical value substitution, statement sequence substitution, blank removal, invalid code insertion, and code encryption. Below are descriptions of each such example obfuscation technique:

1) Variable Name Substitution

The variable name substitution type of obfuscation technique comprises the substitution of variable names included in the tree-structured source data with substitute variable names, while ensuring that the variable definitions, variable value assignments, and variable operations are correct. The variable name substitution includes substituting the variable names of the same variables included in variable declaration nodes, variable value assignments, and variable reference nodes. Furthermore, in variable name substitution, in some embodiments, the substitute variable name parameters (e.g., obfuscation parameters) are generated randomly, and it is ensured that within the same scope of a variable, the variable names of different variables are different, and the logic is correct. For example, random meaningless characters or phrases, such as "a" and "b," can be used as substitute actual variable names in applying the variable name substitution type of obfuscation technique to the tree-structured source data.

2) Function Name Substitution

The function name substitution type of obfuscation technique comprises the substitution of function names included in the tree-structured source data with substitute function names. Function name substitution includes substituting meaningless characters and/or phrases for the originally meaningful function names, and ensuring that the function names of different functions are different and that within the same function, the logic is correct. Function name substitution includes the substitution of the function names of the same functions included in function declaration nodes and function reference nodes. Furthermore, in function name substitution, in some embodiments, the function name substitution parameters (e.g., obfuscation parameters) are generated randomly. For example, the randomly generated term "aa" can substitute for an actual function name that is included in the tree-structured source data.

In the variable name substitution and function name substitution obfuscation techniques described above, original variable names and function names of the tree-structured source data that may have been chosen to be meaningful can be substituted with meaningless (e.g., randomly generated) characters, thus increasing the level of reading difficulty and analysis difficulty for decipherers.

3) Numerical Value Substitution

The numerical value substitution type of obfuscation technique comprises the substitution of mathematical expressions for numerical values included in the tree-structured source data, where the computation results of the substituted mathematical expressions are equal to the original numerical values that they substitute. For example, two numerical value substitution parameters are generated randomly, rand1 and rand2. These two numerical value substitution parameters can form the following mathematical expression (num+rand1*rand2)% rand2, which can be used to express a numerical value. The mathematical expression can be expressed in base 8 or base 16 to increase the degree of obfuscation. For example, the numerical value var1=1 that is included in the tree-structured source data can be substituted with the following mathematical expression (base 16) var1=0307%0x63.

4) Statement Sequence Substitution

The statement sequence substitution type of obfuscation technique comprises the reorganization of the sequence of data that does not have a required invocation sequence, under the condition that the normal execution of the tree-structured source data is not affected. Specifically, for example, multiple statements for which the sequence can be jumbled are placed in a loop structure using a switch function to select the statement sequence, so that the original statement sequence is modified, but during execution, such statements are still executed according to the original statement sequence.

5) Blank Removal

The blank removal type of obfuscation technique comprises checking the tree-structured source data for all carriage returns and spaces between statements and any other types of blank characters and removing such carriage returns and spaces, in order to reduce the readability of the data.

6) Insertion of Invalid Code

Insertion of invalid code comprises a type of obfuscation technique in which invalid code is inserted in the tree-structured source data. The inserted invalid code affects neither the inherent logic of the tree-structured source data nor the normal execution of the tree-structured source data. Therefore, an invalid code library can be predetermined and one or more invalid codes can be selected randomly from this invalid code library for insertion into the tree-structured source data. After the invalid code has been inserted into the tree-structured source data, the tree-structured source data is still able to execute correctly.

7) Code Encryption

Code encryption comprises a type of obfuscation technique in which encryption of the code included in the tree-structured source data is performed. For example, encrypting can be performed on specified types of keywords and character strings of specified lengths within the tree-structured source data or character strings that satisfy specified length criteria. In some embodiments, in the event that encryption is selected as a type of obfuscation technique, the corresponding decryption technique is included in the obfuscated source data such that the encryption can be reversed using the decryption technique when the obfuscated source data is executed at the client device.

Based on the selected code encryption technique and the code encryption key, the cipher text corresponding to the code to be encrypted is computed. The code decryption technique corresponding to the code encryption technique is searched for in the coding technique library. The code encryption key can also serve as the code decryption key or a different code decryption key corresponding to this code encryption key can be generated. The semantic structure corresponding to the code decryption technique can be found in the predetermined tree-structured semantic structure definitions library, and the code decryption key and the cipher text, serving as the parameters of the semantic structure, are mapped into appropriate locations of the semantic structure. This mounted semantic structure is then added to a corresponding location in the tree-structured source data. It is ensured that all code in this location is able to call the appropriate code decryption technique. The code to be encrypted of the tree-structured source data is substituted with the decryption technique invocation format such that when it is time to execute the code, the cipher text can be decrypted and executed using the code decryption technique and the code decryption key.

The selected obfuscation strategy may include any one of the various examples of obfuscation techniques described above. Or the selected obfuscation strategy may include a combination of multiple of the various examples of obfuscation techniques described above, where the obfuscation techniques are each performed one after another, in a designated sequence. Each obfuscation technique or each combination of multiple obfuscation techniques is associated with a different degree of obfuscation.

Different combinations of and different sequences of applying multiple obfuscation techniques, can achieve different obfuscation results. Different obfuscation results include different degrees of obfuscation and different volumes associated with the obfuscated tree-structured source data.

Table 1 below shows different example obfuscation strategies. The obfuscation strategies are labeled in Table 1 as "Combination 1," "Combination 2," "Combination 3," and "Combination 4." Each example obfuscation strategy specifies multiple obfuscation techniques, such as those described above, as well as the sequence in which the obfuscation techniques are to be applied to the tree-structured source data.

TABLE 1

| Execution sequence | Combination 1 | Combination 2 | Combination 3 | Combination 4 |
|---|---|---|---|---|
| 1 | Invalid code insertion | Code encryption | Variable name substitution | Variable name substitution |
| 2 | Code encryption | Variable name substitution | Function name substitution | Function name substitution |
| 3 | Variable name substitution | Function name substitution | Numerical value substitution | Blank removal |
| 4 | Function name substitution | Numerical value substitution | Statement sequence substitution | |
| 5 | Numerical value substitution | Statement sequence substitution | Code encryption | |
| 6 | Statement sequence substitution | Invalid code insertion | Invalid code insertion | |
| 7 | Blank removal | Blank removal | Blank removal | |

In some embodiments, to perform the code encryption type of obfuscation, a code encryption technique is randomly selected from a predetermined coding technique library and a code encryption key is randomly generated.

In Table 1, Combinations 1 through 3 represent three different sequences of applying seven different example types of obfuscation techniques. Although the seven types of obfuscation techniques included in each of Combinations 1 through 3 are the same, due to the differences in the sequences of obfuscation techniques in each combination, the degree of obfuscation of the resulting obfuscated tree-structured source data becomes successively smaller from Combination 1 to Combination 3, and the volume of data also becomes successively smaller from Combination 1 to Combination 3. For example, to obtain a lower degree of obfuscation, a smaller number of obfuscation techniques can be combined to form the obfuscation strategy such as, for example, Combination 4 shown in Table 1.

Obfuscation techniques that can be included in the selected obfuscation strategy are not limited to the several types described herein and can include obfuscation techniques other than those described herein.

At 208, an obfuscated tree-structured source data is determined based at least in part by applying the selected obfuscation strategy to the tree-structured source data.

The tree-structured source data is obfuscated by applying the selected obfuscation strategy to the tree-structured source. If the selected obfuscation strategy specifies multiple obfuscation techniques, in some embodiments, the selected obfuscation strategy also specifies a specified sequence in which to perform such obfuscation techniques.

During the application of each type of obfuscation technique of the selected obfuscation strategy, corresponding obfuscation parameters can be generated. For example, obfuscation parameters can include the substitute parameters (e.g., substitute variable names, substitute function names, substitute numerical values/mathematical expressions, loop structures used in statement sequence substitution, selected invalid code, encryption keys) and other data that are (e.g., randomly or otherwise) generated or selected in performing certain types of obfuscation techniques.

Obfuscation parameters corresponding to an obfuscation technique specified in the one or more obfuscation techniques of the selected obfuscation strategy can be generated depending on the type of obfuscation technique. Variations in the types of obfuscation techniques selected in different obfuscation strategies, variations in the sequence in which obfuscation techniques are combined in different obfuscation strategies, or variations in the obfuscation parameters generated by the obfuscation techniques can cause the obfuscation described herein to be characterized by randomness and disposability. Put another way, the results of obfuscation can differ each time the obfuscation process described with process 200 is utilized with respect to the same scripting resource source data, based on the variation and/or randomness associated with the selected obfuscation strategy. The variability introduced by the obfuscation process described with process 200 described herein effectively increases the security of source data.

Regardless of which obfuscation strategy is selected to be applied to the tree-structured source data, the obfuscation performed with respect to the tree-structured source data is equivalent obfuscation, which indicates that the execution result is the same for the obfuscated tree-structured source data and the cleartext, pre-obfuscation tree-structured source. For example, the character string "javascript" of the tree-structured source data is obfuscated based on the code encryption type of obfuscation technique to obtain the encrypted result of "GvajecsaGpirot." For example, the decryption technique corresponding to the encryption used in obfuscating the tree-structured source data can be included in the tree-structure source data itself such that a client device can use the decryption technique to decrypt the encrypted data. Although "javascript" and "GvajecsaGpirot" are different character strings, they are used in the same manner, semantically, such that when the portion of the source data that includes the obfuscated character string "GvajecsaGpirot" in the obfuscated tree-structured source data is executed at the client device, the client device can decrypt "GvajecsaGpirot" to obtain "javascript" to use in the execution. Therefore, the obfuscated "GvajecsaGpirot" is equivalent to "javascript."

At 210, the obfuscated tree-structured source data is converted into a set of obfuscated scripting resource source data.

In various embodiments, converting the obfuscated tree-structured source data into a set of obfuscated scripting resource source data (e.g., the set of obfuscated scripting resource source data is in a format that is not of a tree-structure) includes: traversing the obfuscated tree-structured source data and analyzing the semantic structures included in the obfuscated tree-structured source data based on the semantic structures included in the predetermined tree-structured semantic structure definitions library. By analyzing the obfuscated tree-structured source data based on the semantic structures included in the predetermined tree-structured semantic structure definitions library, multiple obfuscated semantic structures can be identified and extracted from the obfuscated tree-structured source data. The corresponding obfuscated semantic units can be determined from the extracted obfuscated semantic structures. The set of obfuscated scripting resource source data is built from obfuscated semantic units, which can be determined from the extracted obfuscated semantic structures. Unlike the obfuscated tree-structured source data, the set of obfuscated scripting resource source data is not in a tree-type of structure. However, the set of obfuscated scripting resource source data is in a form that can be transmitted to and executed by (e.g., an application of) the client device.

The set of obfuscated scripting resource source data is sent to the client device where the set of obfuscated scripting resource source data can be executed (e.g., to perform certain functions at the client device and/or modify an associated webpage). Because the obfuscation performed with respect to the tree-structured source data was equivalent obfuscation, the execution results of the obfuscated scripting resource source data at the client device will be the same as if the cleartext, pre-obfuscation scripting resource source data were executed instead.

In some embodiments, converting the obfuscated tree-structured source data into a set of obfuscated scripting resource source data can be performed by a decompiler program.

Because the tree-structured source data has been obfuscated, the content of the set of obfuscated scripting resource source data appears different from the content of the set of scripting resource source data prior to obfuscation. The set of obfuscated scripting resource source data appears to be more complex and less readable, which increases deciphering difficulty and protects the security of the source data. The set of obfuscated scripting resource source data can be executed at a client device without needing to be de-obfuscated first because the selected obfuscation strategy either substitutes at least some original strings and/or numerical values of the cleartext source data with meaningless values but preserves the original code syntax and/or encrypts values that can be decrypted during the execution of the obfuscated source data.

As described in process 200 above, a set of scripting resource source data can be analyzed and organized into a tree-structured source data using logical relationship conversion and/or semantic substitution (obfuscation) of multiple semantic structures in the tree-structured source data. The tree-structured source data can be obfuscated while maintaining consistency in execution results with the pre-obfuscation tree-structured source data. The obfuscated tree-structured source data is then converted into obfuscated scripting resource source data. The execution results of the obfuscated scripting resource source data are identical to those of the scripting resource source data in the cleartext, pre-obfuscation format. In addition, the obfuscation parameters can be generated randomly, which allows for the production of different obfuscation results in different instances of obfuscating the same scripting resource source data. Such variation in obfuscation results can increase the difficulty of deciphering the obfuscated scripting resource source data and increase the security of the scripting resource source data.

In some embodiments, important data can be protected by being added to a set of scripting resource source data and performing equivalent obfuscation (e.g., implemented by a process such as process 200) on the set of scripting resource source data. An example of important data can be encryption tools (e.g., an encryption technique and an encryption key). For example, encryption tools can be included in the set of scripting resource source data prior to obfuscating the set of scripting resource source data. Then, the set of scripting resource source data including the encryption technique and the encryption key can undergo equivalent obfuscation. After undergoing equivalent obfuscation, the content of the encryption technique and the encryption key may change, but the execution results will not change. Therefore, the obfuscation of the encryption technique and the encryption key do not affect their subsequent use but will increase the difficulty in deciphering the encryption technique and the encryption key. By protecting the encryption tools, sensitive data stored at the client device that is encrypted by the encryption tools can also be protected.

Figure 3:
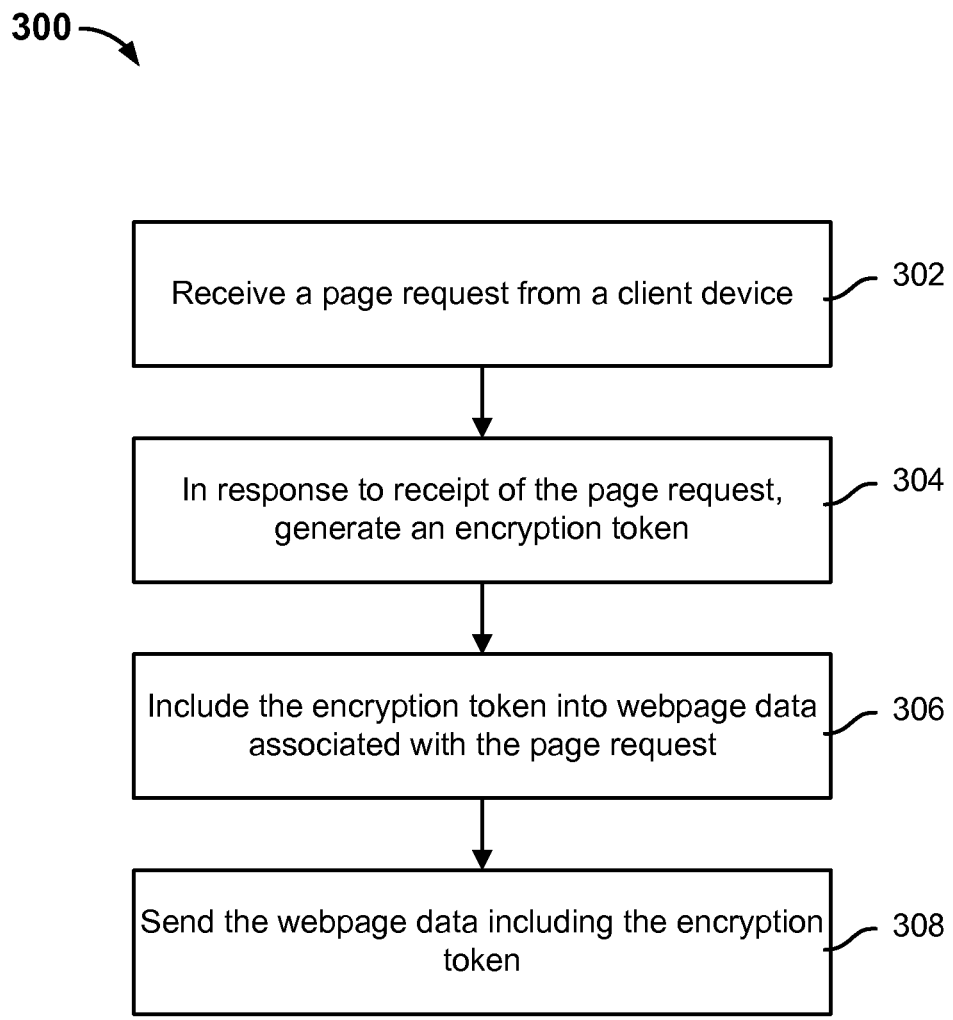
FIG. 3 is a flow diagram showing an embodiment of a process for sending requested webpage data.
Figure 4:
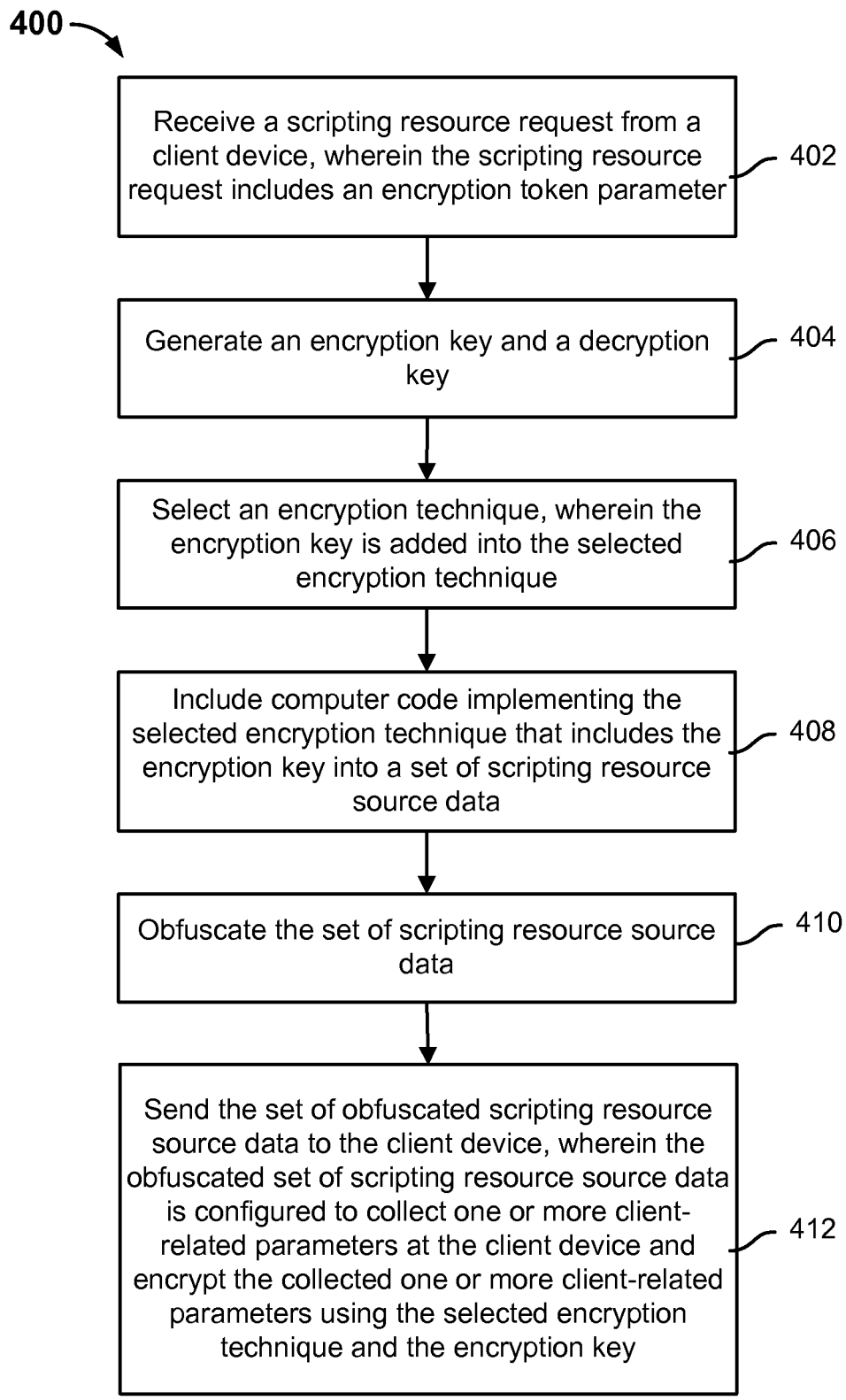
FIG. 4 is a flow diagram showing an embodiment of a process for responding to a scripting resource request.

FIGS. 3 and 4 describe examples in which encryption tools are to be used to encrypt client data.

FIG. 3 is a flow diagram showing an embodiment of a process for sending requested webpage data. In some embodiments, process 300 is implemented at system 100 of FIG. 1. Specifically, in some embodiments, process 300 is implemented at server 104 of system 100 of FIG. 1.

Process 300 describes an example process of sending webpage data that was requested by a client device to the client device. The webpage data sent to the client device further includes an encryption token that is to be used by the client device to request for encryption tools (e.g., computer code implementing an encryption technique and an encryption key) embedded in a set of scripting resource source data. A process of responding to the client device's subsequent request for the encryption tools is described in further detail with FIG. 4, below.

At 302, a page request is received from a client device.

A page request from a client device is received. The page request is used to establish an online session between the client device and the server. The page request also establishes a session token for a new online session. The session token can be used to access the server and thereby ultimately retrieve the web page data corresponding to the page request. The session token of the online session can be a unique identifier, used to express the uninterrupted communication time interval between the client device and the server. The session token can also be used to identify the client device and maintain communication between this client device and the server.

At 304, in response to receipt of the page request, an encryption key is generated.

An encryption token can be generated for the session token corresponding to the page request. In some embodiments, the encryption token is randomly generated. Data indicating the one-to-one correspondence between the session token and the encryption token is stored in an encryption token library at the server. For example, the encryption token can be a random character string of not less than 16 bits comprising data or letters.

At 306, the encryption token is included into webpage data associated with the page request.

In some embodiments, the encryption token is written to a relevant location of the webpage data associated with the received page request. In some embodiments, the webpage data includes an address from which the client device is to request a set of scripting resource source data.

For example, the generated encryption token is written into the following statement of the requested webpage data: <script type="text/javascript" src="http://xyz.com/yyy.js?token=abcdefghijklmn0123456789"></script>. In this example statement, "token=abcdefghijklmn0123 456789" is the encryption token and the value of this encryption token, "abcdefghijklmn0123456789", is generated randomly by the server. Furthermore, in this example statement, "http://xyz.com/yyyjs" is the address of the JavaScript scripting resource that the client device needs to request. For example, the JavaScript scripting resource that is available at the specified address, when executed, is configured to collect and also encrypt certain parameters stored at the client device.

At 308, the webpage data including the encryption token is sent to the client device.

The client device (or an application, such as a web browser, executing at the client device) is configured to render the received webpage data including the encryption token.

As the webpage data is being rendered at the client device, it is determined that the JavaScript scripting resource referenced in the webpage is not present in the client device. Therefore, the client device is configured to transmit a scripting resource request to the server associated with the address included in the webpage data to retrieve the scripting resource source data and to complete loading of the scripting resource. As will be further described with FIG. 4 below, the scripting source data may include encryption tools and furthermore, the scripting source data including the encryption tools can be obfuscated prior to being sent to the client device.

FIG. 4 is a flow diagram showing an embodiment of a process for responding to a scripting resource request. In some embodiments, process 400 is implemented at system 100 of FIG. 1. Specifically, in some embodiments, process 400 is implemented at server 104 of system 100 of FIG. 1.

Process 400 describes an example process of responding to a scripting resource request, including by including an encryption technique and an encryption key into the requested set of scripting resource source data. Process 400 further describes obfuscating the set of scripting resource source data prior to sending the set of scripting resource source data to the client device. In some embodiments, the set of scripting resource source data, when executed at the client device, is configured to collect certain parameters stored by the client device, encrypt the collected parameters using the encryption technique and the encryption key, and send the encrypted data back to the server for the server to verify, as will be described in further detail with FIG. 5, below.

At 402, a scripting resource request is received from a client device, wherein the scripting resource request includes an encryption token parameter.

In some embodiments, the scripting resource request is generated at the client device while webpage data is being rendered at the client device. The webpage data was sent to the client device from the server using a process such as process 300 of FIG. 3. For example, the scripting resource request is generated at the client device in response to the client device's determination that the set of scripting resource source data referenced by the webpage data is not available at the client device. The webpage data may include an address to which the client device can send the scripting resource request to obtain the set of scripting resource source data.

The scripting resource request includes an encryption token parameter, whose value is the encryption token that was included in the webpage data. In some embodiments, the encryption token was randomly generated and stored at the server. In various embodiments, the scripting resource request is associated with the same online session that was established in response to the server's receipt of the page request of process 300 of FIG. 3.

At 404, an encryption key and a decryption key corresponding to the encryption token parameter are generated.

In some embodiments, a unique encryption key is randomly generated. In some embodiments, a unique encryption key is generated at the server based at least in part on the encryption token parameter included in this scripting resource request. Data indicating the correspondence between the encryption key and the encryption token is stored in an encryption key library at the server.

A decryption key corresponding to the encryption key is also generated and stored in this encryption key library at the server. In some embodiments, the decryption key is generated to be identical to the encryption key. In some embodiments, a decryption key is generated based on the encryption key.

At 406, an encryption technique is selected, wherein the encryption key is added into the selected encryption technique.

In some embodiments, an encryption technique is randomly selected from a preset encryption technique library. In some embodiments, an encryption technique can be selected from the preset encryption technique library based on predetermined rules and/or the encryption token parameter. The encryption techniques stored in the preset encryption technique library can be symmetric encryption techniques or asymmetric encryption techniques. The encryption techniques stored in the preset encryption technique library can be maintained and updated on a regular basis. Data indicating the correspondence between a label associated with the encryption technique and the encryption token is stored at the server. The label is used to uniquely identify the selected encryption technique (e.g., from the preset encryption technique library) and a decryption technique corresponding to the selected encryption technique.

The encryption key is written into the encryption technique. For example, the encryption key is added into the computer code implementing the selected encryption technique as an encryption technique parameter.

At 408, computer code implementing the selected encryption technique that includes the encryption key is included into a set of scripting resource source data.

Computer code implementing the selected encryption technique code (including the encryption key) is assembled into the scripting resource source code representing the JavaScript scripting resource. The code implementing the selected encryption technique containing the encryption key is placed in a relevant location of the set of scripting resource source data. For example, the code implementing the selected encryption technique containing the encryption key is placed in a portion of the set of scripting resource source code that is not nested into any loop structures.

At 410, the set of scripting resource source data is obfuscated.

The set of scripting resource source data including the computer code implementing the encryption technique with the encryption key is obfuscated to decrease the likelihood that the set of scripting resource source data and the embedded encryption information will be deciphered at the client device. In some embodiments, the set of scripting resource source data can be obfuscated using a process such as process 200 of FIG. 2.

At 412, the obfuscated set of scripting resource source data is sent to the client device, wherein the obfuscated set of scripting resource source data is configured to collect one or more client-related parameters at the client device and encrypt the collected one or more client-related parameters using the selected encryption technique and the encryption key.

The set of obfuscated scripting resource source data is transmitted to the client device. In some embodiments, the client device can execute the set of obfuscated scripting resource source data to collect parameters stored at the client device and to utilize the encryption technique and the encryption key in the set of scripting resource source data to encrypt and protect the collected client-related parameters.

Client-related parameters that can be collected by the executed set of obfuscated scripting resource source data at the client device comprise parameters that are stored at the client device. At least some of such client-related parameters may be sensitive data. Examples of client-related parameters that may be collected by the executing set of obfuscated scripting resource source data include one or more of the following: client environment parameters, user action parameters, and browser plug-in invocation parameters. Specific examples of client environment parameters include the version of the web browser, the version of the operating system, the dimensions (e.g., size and aspect) of the screen of the client device, and the screen resolution of the client device. Specific examples of the user action parameters include mouse movement information, mouse click information, key stroke information, and focal point movement information. Specific examples of the browser plug-in invocation parameters include invocation of other browser controls and client MAC addresses. In various embodiments, the collected client-related parameters also include the encryption token parameter, which has the value of the encryption token that was included in the webpage data.

The specific types of client-related parameters that are to be collected by the executing set of obfuscated scripting resource data can be written into the scripting resource source data in advance and then such parameters can be collected when the client executes the scripting resource source data.

After the relevant parameters have been collected, the executing set of obfuscated scripting resource source data at the client device performs data encryption on the collected parameters using the obfuscated encryption technique and the obfuscated encryption key included in the set of obfuscated scripting resource source data. The encrypted parameters are transmitted to the server for verification. As will be described with more detail in FIG. 5 below, a verification request including the encrypted data (the encrypted relevant parameters collected from the client device) and the encryption token is transmitted to the server. The server can perform data integrity verification on the transmitted parameters to determine the presence of any illegal operations such as forgery, falsification, or replacement that may have occurred at the client device.

Figure 5:
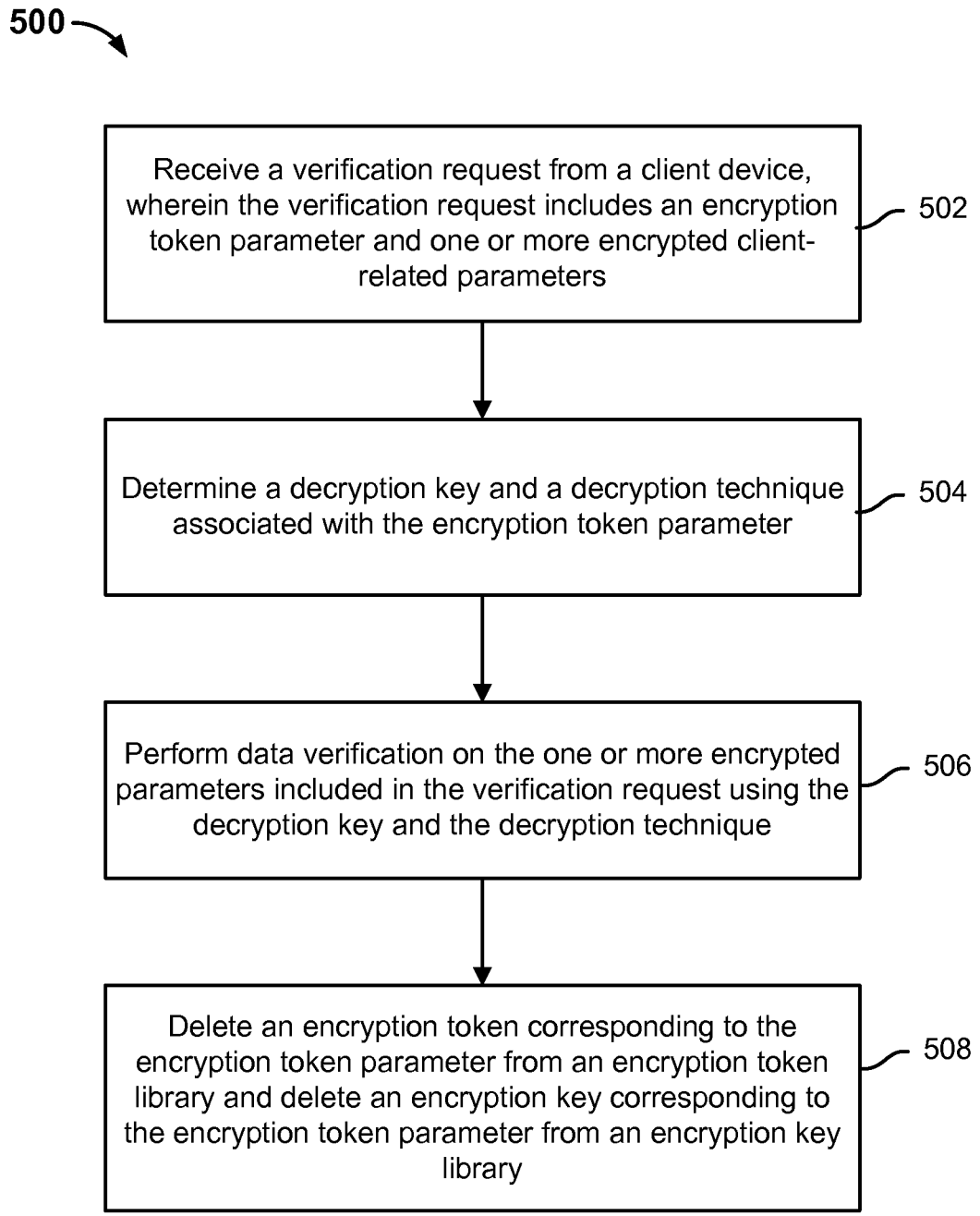
FIG. 5 is a flow diagram showing an embodiment of a process for responding to a scripting resource request.

FIG. 5 is a flow diagram showing an embodiment of a process for responding to a scripting resource request. In some embodiments, process 500 is implemented at system 100 of FIG. 1. Specifically, in some embodiments, process 500 is implemented at server 104 of system 100 of FIG. 1.

Process 500 describes an example process in which encrypted client-related parameters are received from a client device and verified to determine whether any malicious activity might have occurred at the client device.

At 502, a verification request is received from a client device, wherein the verification request includes an encryption token parameter and one or more encrypted client-related parameters.

For example, in response to receiving a page request from a client device at the server, the server sends the client device webpage data that includes an encryption token and data usable to obtain a set of scripting resource source data such as implemented by a process such as process 300 of FIG. 3. As the webpage data is being processed at the client device, the server can receive from the client device a scripting resource request that includes the encryption token (from the webpage data). In response to receiving the scripting resource request, the server can locate the requested set of scripting resource source data, which is configured at least to collect client-related parameters and select an encryption technique and an encryption key. As described by a process such as process 400 of FIG. 4, the server includes computer code implementing the selected encryption technique and the encryption key into the set of scripting resource data and, optionally, obfuscates the set of scripting resource data (e.g., using the obfuscation process described in a process such as process 200 of FIG. 2) and sends the set of (obfuscated) scripting resource data to the client device. As mentioned above, the set of (obfuscated) scripting resource source data executing at the client device is configured to collect certain client-related parameters and to encrypt the collected parameters using the encryption technique and the encryption key included in the set of (obfuscated) scripting resource source data. The set of (obfuscated) scripting resource source data executing at the client device is then configured to send a verification request to the server. In various embodiments, the verification request includes an encryption token parameter and the one or more encrypted client-related parameters. The value of the encryption token parameter of the verification request is the encryption token that was included in the webpage data that was previously sent from the server.

In some embodiments, a data integrity verification process is performed at the server on the encrypted parameters to determine whether any encrypted data exists (e.g., a blank value indicates that encrypted data does not exist), whether the encrypted data can be decrypted, and whether there has been any data replacement. As will be described in further detail with FIG. 5 below, if any of encrypted data does exist, the encrypted data is not able to be decrypted, and/or if data replacement is detected, then it is determined that the data integrity verification has failed and it is assumed that at least data stored at the client device has been compromised.

In some embodiments, the parameters included in the encrypted data of the verification request include the encryption token parameter, client environment parameters, user action parameters, and browser plug-in invocation parameters.

In various embodiments, the verification request is associated with the same online session that was established in response to the server's receipt of the page request of a process such as process 300 of FIG. 3 and associated with the scripting resource request of a process such as process 400 of FIG. 4.

At 504, a decryption key and a decryption technique associated with the encryption token parameter are determined.

A decryption technique that performs the reverse operation of the encryption technique corresponding to the encryption token included in the verification request is stored in the encryption technique library of the server. A decryption key corresponding to the encryption key corresponding to the encryption token included in the verification request is stored in the encryption key library of the server. Therefore, using the encryption token parameter included in the verification request, the appropriate decryption technique and decryption key can be retrieved from libraries at the server based on stored corresponding relationships. Because the encryption technique and the encryption key remain semantically unchanged after having undergone equivalent obfuscation, a decryption technique corresponding to the original, pre-obfuscation encryption technique and the original, pre-obfuscation decryption key corresponding to the obfuscated encryption key can be searched for respectively, in the encryption technique library and the encryption key library.

At 506, data verification is performed on the one or more encrypted parameters included in the verification request using the decryption key and the decryption technique.

In some embodiments, to perform data verification of the encrypted parameters included in the verification request, first it is determined whether the encrypted parameters include non-null value data. If the encrypted parameters have null values, this indicates that the encrypted parameters are not present and therefore, the verification is invalid and the encrypted parameters are determined to be suspicious data and that the data verification has failed. Otherwise, if the encrypted parameters have non-null values, then the data decryption verification is performed next.

During the data decryption verification, the non-null value encrypted parameters included in the verification request are decrypted using the determined decryption key and the decryption technique. If the encrypted parameters cannot be decrypted (e.g., because the format of the encrypted data does not conform to the format required by the decryption technique and/or the decryption technique cannot successfully decrypt the encrypted data) using the determined decryption key and the decryption technique (e.g., the decryption is determined to be invalid), then it is assumed that malicious operations may have occurred with respect to the encrypted parameters, the data integrity verification outputs an invalid result, the encrypted parameters are determined to be suspicious data, and the data verification has failed. Otherwise, if the encrypted parameters can be successfully decrypted, then the decrypted parameters corresponding to the encrypted parameters are generated and anti-data replacement verification (also referred to as anti-replacement verification) is performed on these decrypted parameters.

In the anti-replacement verification, the encryption token parameter included among the decrypted parameters is extracted and is compared with the encryption token parameter included in the verification request. In the event that the extracted encryption token parameter is identical to the encryption token parameter included in the verification request, then it is determined that the encrypted parameters have passed the data verification.

Because the communication between the client device and the server since the client device initially sent the page request to the server (e.g., as described with a process such as process 300 of FIG. 3) has been associated with the same online session and therefore, the same session token, the session token corresponding to this online session can be looked up in the encryption token library at the server. In some embodiments, the anti-replacement verification further includes determining whether the encryption token corresponding to the looked up session token in the encryption token library is identical to the value of the encryption token parameter extracted from the decrypted parameters. If the encryption token corresponding to the looked up session token in the encryption token library is not identical to the value of the encryption token parameter extracted from the decrypted parameters, then it is determined that data at the client device has been replaced and thus these decrypted parameters are determined to be suspicious data and that the data verification has failed. Otherwise, if the encryption token corresponding to the looked up session token in the encryption token library is identical to the value of the encryption token parameter extracted from the decrypted parameters, then it is determined that the encrypted parameters have passed the data verification.

If the encrypted parameters submitted by a client device via the verification request are determined to have passed the data verification, the encrypted parameters can be determined to be legal data and relied upon to perform analysis of client operation actions. In some embodiments, the server sends a successful data verification results message to the client device.

However, if the encrypted parameters submitted by a client device via the verification request are determined to not have passed the data verification, the encrypted parameters can be determined to be suspicious data and a data verification results message including an alert indicating abnormal/malicious activity is sent to the client device.

At 508, an encryption token corresponding to the encryption token parameter is deleted from an encryption token library and an encryption key corresponding to the encryption token parameter is deleted from an encryption key library.

In various embodiments, after the data verification process is completed, the encryption token and encryption key generated in the current online session are deleted from the encryption token library and the encryption key library, in order to ensure that the encryption token and the encryption key are not used again. Such clean up ensures a one-time use of encryption tokens and encryption keys, which can increase the difficulty in deciphering the source data.

Figure 6:
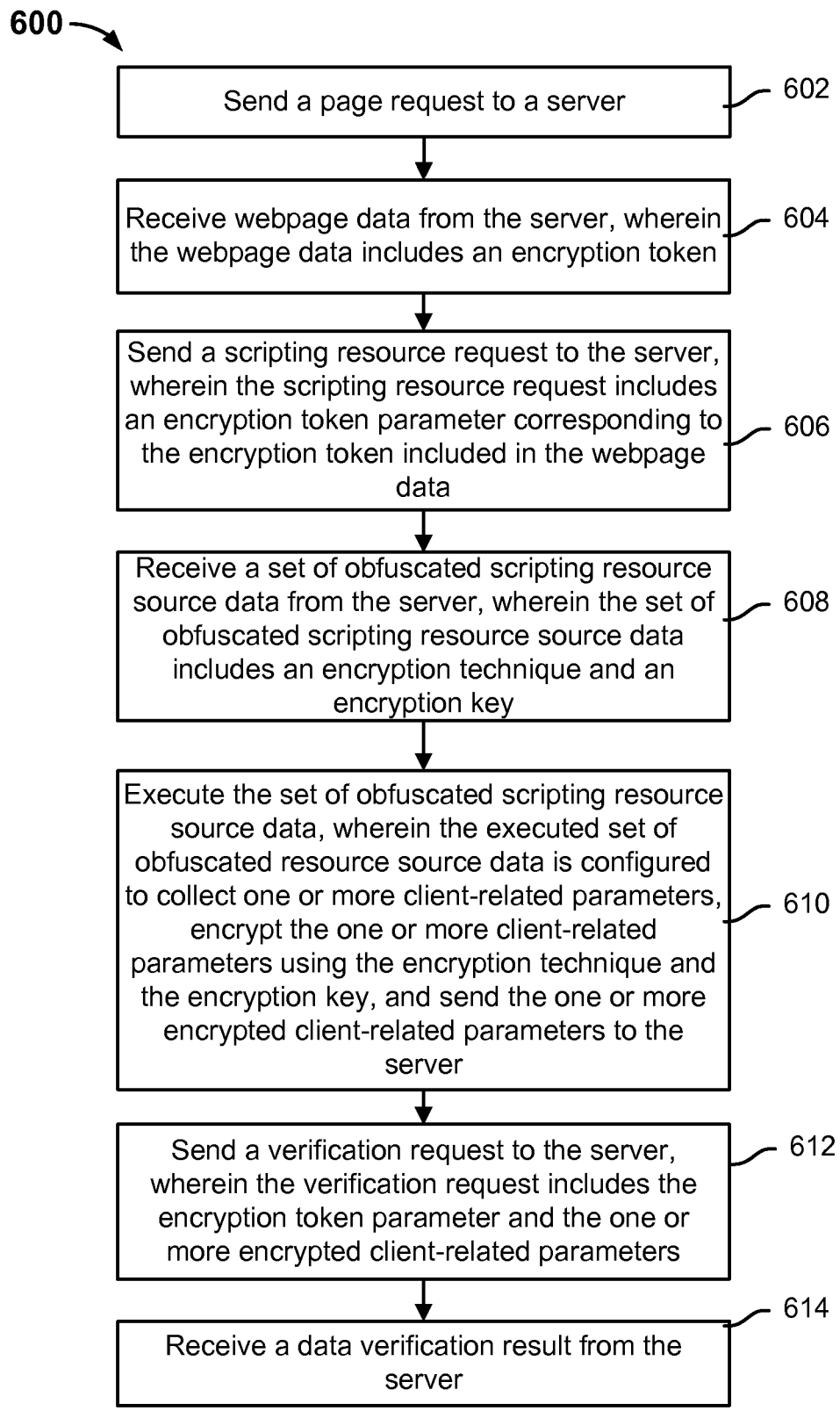
FIG. 6 is a flow diagram showing an embodiment of a requesting webpage data.

FIG. 6 is a flow diagram showing an embodiment of a requesting webpage data. In some embodiments, process 600 is implemented at system 100 of FIG. 1. Specifically, in some embodiments, process 600 is implemented at client device 102 of system 100 of FIG. 1.

Process 600 describes an example process of a client device requesting webpage data from a server and eventually being caused to send encrypted client-related parameters to the server for data verification.

At 602, a page request is sent to a server. For example, the client device can send a page request in response to a received user selection or user input of a web address.

At 604, webpage data is received from the server, wherein the webpage data includes an encryption token. The server establishes a new online session, generates an encryption token, includes the encryption token in the requested webpage data, and sends the webpage data back to the client device. For example, the server can perform a process such as process 300 of FIG. 3 to process the page request.

At 606, a scripting resource request is sent to the server, wherein the scripting resource request includes an encryption token parameter corresponding to the encryption token included in the webpage data. In various embodiments, the webpage data includes a reference to a set of scripting resource source data (e.g., a JavaScript scripting resource) that is to be requested from a provided web address. As the client device renders the webpage data, it will detect the reference to the set of scripting resource source data in the webpage data and in response, generate a scripting resource request that includes an encryption token parameter to send to the server based on the web address. The encryption token parameter included in the scripting resource request has a value that is the same as the encryption token that was included in the webpage data. For example, the server can perform process 400 of FIG. 4 to process the scripting resource request. In some embodiments, the client device sends the scripting resource request as part of the same online session that was established in response to the page request.

At 608, a set of obfuscated scripting resource source data is received from the server, wherein the set of obfuscated scripting resource source data includes an encryption technique and an encryption key. For example, the set of scripting resource source data was obfuscated using a process such as process 200 of FIG. 2.

At 610, the set of obfuscated scripting resource source data is executed, wherein the executed set of obfuscated resource source data is configured to collect one or more client-related parameters, encrypt the one or more client-related parameters using the encryption technique and the encryption key, and send the one or more encrypted client-related parameters to the server. In some embodiments, the set of obfuscated scripting resource source data can collect client device stored data for the server to verify to determine whether any malicious activity might have occurred at the client device.

At 612, a verification request is sent to the server, wherein the verification request includes the encryption token parameter and the one or more encrypted client-related parameters. For example, the server is configured to perform data verification on the encrypted client-related parameters of the received verification request using a process such as process 500 of FIG. 5. In some embodiments, the client device sends the verification request as part of the same online session that was established in response to the page request.

At 614, a data verification result is received from the server. A message indicating whether the encrypted client-related parameters of the verification request passed the verification or not is sent to the client device. In the event that the encrypted client-related parameters did not pass the verification, the message may include a warning that data stored at the client device may be compromised. In the event that the encrypted client-related parameters did pass the verification, the message may include a confirmation the client-related parameters have been successfully received. In some embodiments, in the event that the encrypted client-related parameters did pass the verification, no message is sent to the client device at all.

Figure 7:
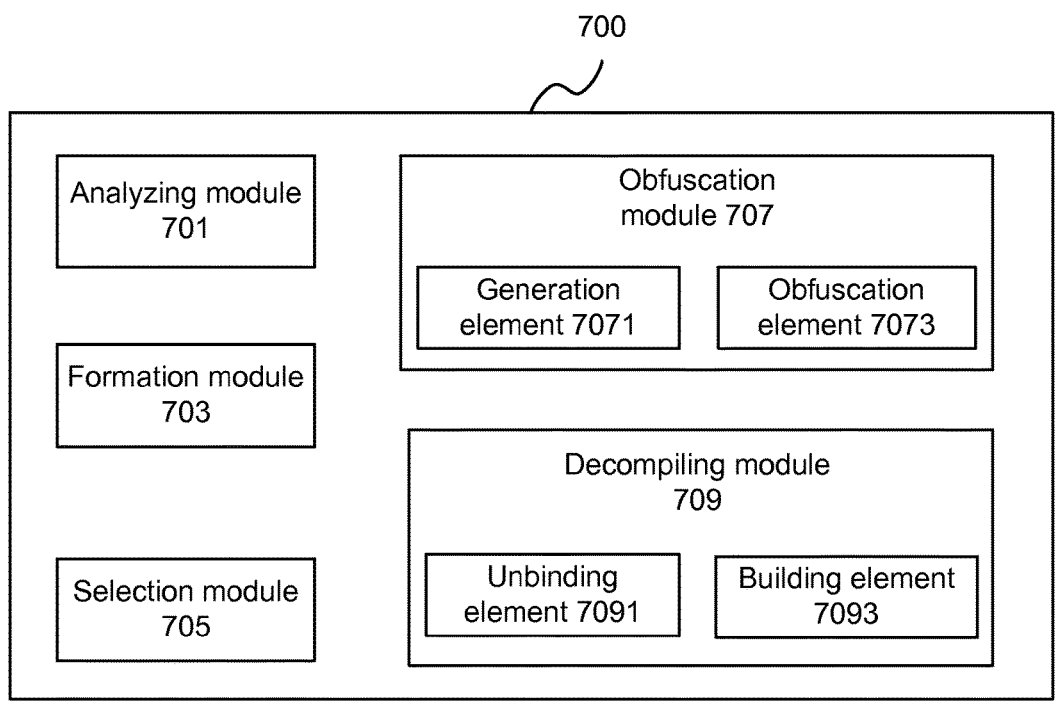
FIG. 7 is a diagram showing an embodiment of a server configured to protect data.

FIG. 7 is a diagram showing an embodiment of a server configured to protect data. In the example, system 700 includes analyzing module 701, formation module 703, selection module 705, obfuscation module 707, and a decompiling module 709.

The modules and elements can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and elements may be implemented on a single device or distributed across multiple devices.

Analyzing module 701 is configured to analyze a set of scripting resource source data to determine a plurality of semantic units.

Formation module 703 is configured to determine a tree-structured source data based at least in part on mapping values of the plurality of semantic units to respective ones of a plurality of semantic structures.

Selection module 705 is configured to select an obfuscation strategy to apply to the tree-structured source data, wherein the selected obfuscation strategy includes one or more obfuscation techniques. The selected obfuscation strategy may comprise a combination of at least one of the following obfuscation techniques: variable name substitution, function name substitution, numerical value substitution, statement sequence substitution, blank removal, invalid code insertion, and code encryption.

Obfuscation module 707 is configured to determine an obfuscated tree-structured source data based at least in part by applying the selected obfuscation strategy to the tree-structured source data.

Obfuscation module 707 further comprises generation element 7071 and obfuscation element 7073. Generation element 7071 is configured to generate zero or more obfuscation parameters corresponding to each of the obfuscation techniques included in the selected obfuscation strategy. Obfuscation element 7073 is configured to perform obfuscation of the tree-structured source data based on the one or more obfuscation techniques and the corresponding obfuscation parameters generated by generation element 7071.

Decompiling module 709 is configured to convert the obfuscated tree-structured source data into a set of obfuscated scripting resource source data. Decompiling module 709 further comprises unbinding element 7091 and building element 7093. Unbinding element 7091 is configured to obtain obfuscated semantic structures by unbinding the obfuscated tree-structured source data. Building element 7093 is configured to build the obfuscated scripting resource source data using the obfuscated semantic units corresponding to the obfuscated semantic structures.

The various embodiments in this description are generally described in a progressive manner. The explanation of each embodiment focuses on areas of difference from the other embodiments, and the descriptions thereof may be mutually referenced for portions of the embodiments that are identical or similar.

The present application can be described in the general context of computer executable commands executed by a computer, such as a program module or unit. Generally, program modules or units can include routines, programs, objects, components, data structures, etc. to execute specific tasks or achieve specific abstract data types. Typically, the program module or unit can be realized by software, hardware, or a combination of the two. The present application can also be carried out in distributed computing environments. In such distributed computing environments, tasks are executed by remote processing equipment connected via communication networks. In distributed computing environments, program modules or units can be located on storage media at local or remote computers that include storage equipment.

A person skilled in the art should understand that the embodiments of the present application can be provided as methods, systems or computer program products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

This document has employed specific embodiments to expound the principles and forms of implementation of the present application. The above embodiment explanations are only meant to aid in comprehension of the methods of the present application and of its main concepts. Moreover, a person with general skill in the art would, on the basis of the concepts of the present application, be able to make modifications to specific forms of implementation and to the scope of applications. To summarize the above, the contents of this description should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
one or more processors configured to:
receive a page request from a client device;
in response to receipt of the page request, generate an encryption token;
include the encryption token into webpage data associated with the page request;
send the webpage data including the encryption token;
receive a scripting resource request, wherein the scripting resource request includes the encryption token;
in response to receiving the scripting resource request, randomly generate an encryption key and a decryption key;
randomly select an encryption technique from a preset encryption technique library, wherein the encryption key is added into the selected encryption technique;
include computer code implementing the selected encryption technique that includes the encryption key into a set of scripting resource source data;

analyze the set of scripting resource source data to determine a plurality of semantic units from the set of scripting resource source data;
determine a tree-structured source data based at least in part on mapping values of the plurality of semantic units to respective ones of a plurality of semantic structures;
select an obfuscation strategy to apply to the tree-structured source data, wherein to select the obfuscation strategy comprises to dynamically select a plurality of obfuscation techniques to meet a desired level of obfuscation associated with the set of scripting resource source data according to a plurality of degrees of obfuscation corresponding to respective ones of the plurality of obfuscation techniques, wherein to select the obfuscation strategy comprises to select a sequence in which the plurality of obfuscation techniques is to be applied;
determine an obfuscated tree-structured source data based at least in part by applying the selected obfuscation strategy to the tree-structured source data;
convert the obfuscated tree-structured source data into a set of obfuscated scripting resource source data; and
send the set of obfuscated scripting resource source data from a server to the client device, wherein the set of obfuscated scripting resource source data is configured to be executed at the client device to yield a first set of results, wherein the first set of results is equal to a second set of results that would be yielded if the set of scripting resource source data had been executed at the client device; and
one or more memories coupled to the one or more processors configured to provide the one or more processors with instructions.

2. The system of claim 1, wherein the one or more processors are further configured to determine the plurality of semantic structures corresponding to respective ones of the plurality of semantic units from a predetermined tree-structured semantic structure definitions library.

3. The system of claim 1, wherein to analyze the set of scripting resource source data to determine the plurality of semantic units is performed as a part of a compiling process.

4. The system of claim 1, wherein the plurality of obfuscation techniques includes one or more of the following: variable name substitution, function name substitution, numerical value substitution, statement sequence substitution, blank removal, invalid code insertion, and code encryption.

5. The system of claim 1, wherein to convert the obfuscated tree-structured source data into the set of obfuscated scripting resource source data is performed as a part of a decompiling process.

6. The system of claim 1, wherein to convert the obfuscated tree-structured source data into the set of obfuscated scripting resource source data includes to:
traverse the obfuscated tree-structured source data;
extract the plurality of semantic structures included in the obfuscated tree-structured source data based at least in part on semantic structures included in a predetermined tree-structured semantic structure definitions library; and
determine a plurality of obfuscated semantic units from the plurality of semantic structures.

7. The system of claim 1, wherein the obfuscated set of scripting resource source data is configured to collect one or more client-related parameters at the client device and encrypt the collected one or more client-related parameters using the selected encryption technique and the encryption key.

8. The system of claim 7, wherein the one or more processors are further configured to:
receive a verification request, wherein the verification request includes the encryption token and the encrypted one or more client-related parameters;
determine the decryption key and a decryption technique associated with the encryption token;
perform data verification on the encrypted one or more client-related parameters using the decryption key and the decryption technique; and
subsequent to the performance of data verification, delete the encryption token from an encryption token library and delete a stored encryption key corresponding to the encryption key from an encryption key library.

9. The system of claim 8, wherein to perform data verification on the encrypted one or more client-related parameters using the decryption key and the decryption technique includes to:
determine whether any of the encrypted one or more client-related parameters comprise a null value;
in the event that none of the encrypted one or more client-related parameters comprises the null value, determine whether the encrypted one or more client-related parameters are decrypted into a plurality of decrypted parameters using the decryption technique and the decryption key; and
in the event that the encrypted one or more client-related parameters are decrypted into the plurality of decrypted parameters, determine whether the encryption token is included in the plurality of decrypted parameters.

10. The system of claim 9, wherein in the event that at least one of the encrypted one or more client-related parameters comprises the null value, the one or more processors are further configured to determine that the data verification has failed and send an alert to the client device.

11. The system of claim 9, wherein in the event that the encrypted one or more client-related parameters are not decrypted into the plurality of decrypted parameters, the one or more processors are further configured to determine that the data verification has failed and send an alert to the client device.

12. The system of claim 9, wherein in the event that the encryption token is not included in the plurality of decrypted parameters, the one or more processors are further configured to determine that the data verification has failed and send an alert to the client device.

13. The system of claim 9, wherein in the event that the encryption token is included in the plurality of decrypted parameters, the one or more processors are further configured to send a successful data verification results message to the client device.

14. A method, comprising:
receiving a page request from a client device;
in response to receipt of the page request, generating an encryption token;
including the encryption token into webpage data associated with the page request;
sending the webpage data including the encryption token;
receiving a scripting resource request, wherein the scripting resource request includes the encryption token;
in response to receiving the scripting resource request, randomly generating an encryption key and a decryption key;

randomly selecting an encryption technique from a preset encryption technique library, wherein the encryption key is added into the selected encryption technique;

including computer code implementing the selected encryption technique that includes the encryption key into a set of scripting resource source data;

analyzing, using one or more processors, the set of scripting resource source data to determine a plurality of semantic units from the set of scripting resource source data;

determining a tree-structured source data based at least in part on mapping values of the plurality of semantic units to respective ones of a plurality of semantic structures;

selecting an obfuscation strategy to apply to the tree-structured source data, wherein selecting the obfuscation strategy comprises dynamically selecting a plurality of obfuscation techniques to meet a desired level of obfuscation associated with the set of scripting resource source data according to a plurality of degrees of obfuscation corresponding to respective ones of the plurality of obfuscation techniques, wherein selecting the obfuscation strategy comprises selecting a sequence in which the plurality of obfuscation techniques is to be applied;

determining an obfuscated tree-structured source data based at least in part by applying the selected obfuscation strategy to the tree-structured source data;

converting the obfuscated tree-structured source data into a set of obfuscated scripting resource source data; and sending the set of obfuscated scripting resource source data from a server to the client device, wherein the set of obfuscated scripting resource source data is configured to be executed at the client device to yield a first set of results, wherein the first set of results is equal to a second set of results that would be yielded if the set of scripting resource source data had been executed at the client device.

15. The method of claim 14, wherein the plurality of obfuscation techniques includes one or more of the following: variable name substitution, function name substitution, numerical value substitution, statement sequence substitution, blank removal, invalid code insertion, and code encryption.

16. The method of claim 14, wherein converting the obfuscated tree-structured source data into the set of obfuscated scripting resource source data includes:
traversing the obfuscated tree-structured source data;
extracting the plurality of semantic structures included in the obfuscated tree-structured source data based at least in part on semantic structures included in a predetermined tree-structured semantic structure definitions library; and
determining a plurality of obfuscated semantic units from the plurality of semantic structures.

17. The method of claim 14, wherein the obfuscated set of scripting resource source data is configured to collect one or more client-related parameters at the client device and encrypt the collected one or more client-related parameters using the selected encryption technique and the encryption key.

18. The method of claim 17, further comprising:
receiving a verification request, wherein the verification request includes the encryption token and the encrypted one or more client-related parameters;
determining the decryption key and a decryption technique associated with the encryption token;
performing data verification on the encrypted one or more client-related parameters using the decryption key and the decryption technique; and
subsequent to the performance of data verification, deleting the encryption token from an encryption token library and deleting a stored encryption key corresponding to the encryption key from an encryption key library.

* * * * *

UNITED STATES PATENT AND TRADEMARK OFFICE
CERTIFICATE OF CORRECTION

PATENT NO. : 9,836,612 B2
APPLICATION NO. : 14/280145
DATED : December 5, 2017
INVENTOR(S) : Jian Li Page 1 of 1

It is certified that error appears in the above-identified patent and that said Letters Patent is hereby corrected as shown below:

On the Title Page

Item (56), References Cited, Other Publications, delete "Github. "UglifyJS", Jun. 2011, pp. 1-8 http://web.archive.org/web/20130807040731/https://github.com/mishooUglify- JS/." and insert --Github. "UglifyJS", Jun. 2011, pp. 1-8 http://web.archive.org/web/20130807040731/https://github.com/mishoo/Uglify- JS/.--, therefor.

In the Specification

In Column 14, Line 27, delete "http://xyz.com/yyyjs" and insert --http://xyz.com/yyy.js--, therefor.

Signed and Sealed this
Seventeenth Day of April, 2018

Andrei Iancu
*Director of the United States Patent and Trademark Office*